July 13, 1965 — R. W. GRANT — 3,194,070
FLOAT CONSTRUCTION
Filed April 29, 1963 — 2 Sheets-Sheet 1

INVENTOR.
RICHARD W. GRANT
BY Lyon&Lyon
ATTORNEYS

July 13, 1965 R. W. GRANT 3,194,070
FLOAT CONSTRUCTION
Filed April 29, 1963 2 Sheets-Sheet 2

INVENTOR.
RICHARD W. GRANT
BY Lyon & Lyon
ATTORNEYS

3,194,070
FLOAT CONSTRUCTION

Richard W. Grant, Inglewood, Calif., assignor to Zila Manufacturing Corporation, Gardena, Calif., a corporation of California
Filed Apr. 29, 1963, Ser. No. 276,558
6 Claims. (Cl. 73—322.5)

This application is a continuation-in-part of my prior application Serial No. 829,737 filed July 27, 1959, now abandoned.

This invention relates to operated valves of the type commonly employed in water closet tanks, and this invention is particularly directed to a novel form of float for operating the valve controlling flow of water or other liquid into the float tank.

For proper operation of the tank valve, the float must be buoyant enough to close the valve against the pressure of the liquid in the supply pipe, and it must be heavy enough to supply adequate force to open the valve after the tank has been emptied. It is the principal object of this invention to meet both of these requirements with a novel form of float which may be economically manufactured on a quantity production basis.

Another object of this invention is to provide a float of this type which automatically fills with liquid to a predetermined level within the float to provide the required weight, and which liquid within the float communicates with liquid within the tank each time the tank is filled, to prevent the liquid within the float from becoming stagnant.

Another object is to provide a float formed of two duplicate half sections connected together and prevented from separating by the float rod which connects the float to the float-operated valve.

Other and more detailed objects and advantages will appear hereinafter.

Figure 1:
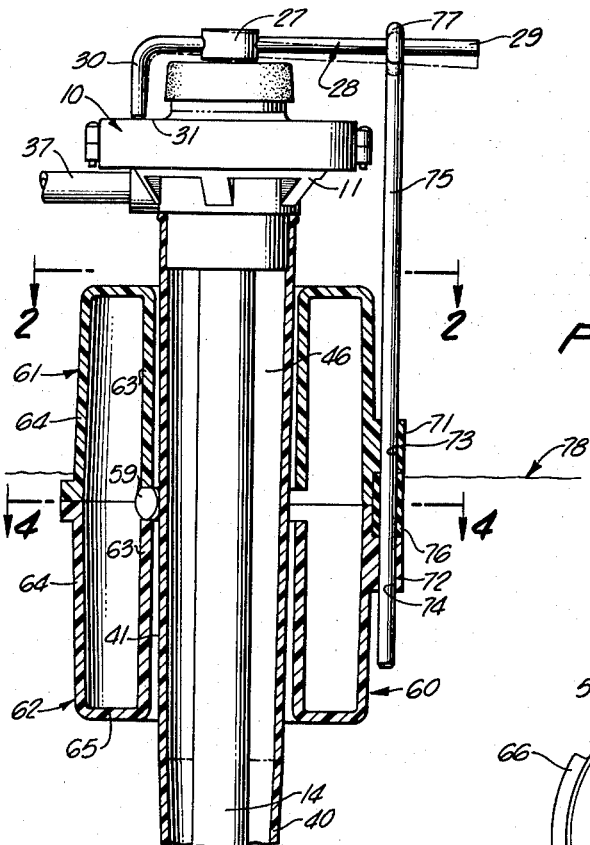
FIGURE 1 is a sectional elevation showing a preferred embodiment of my invention.
Figure 2:
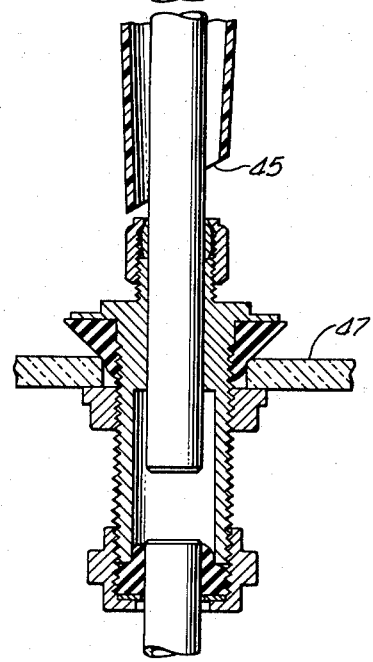
FIGURE 2 is a sectional plan view thereof, taken in the direction of the lines 2—2 as shown in FIGURE 1.
Figure 2:
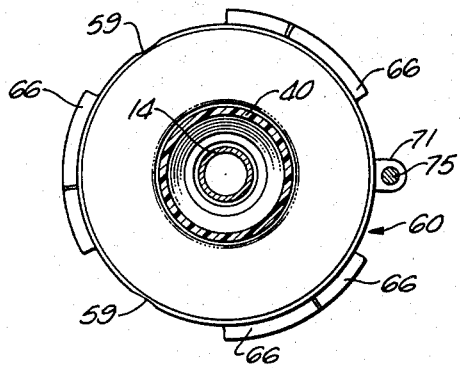

Referring to the drawings, the valve assembly generally designated 10 includes a valve body 11 mounted on the upper end of the water-supply tube 14.

A valve-operating lever 28 has a horizontal portion 29 which extends through an opening in the boss 27 and a short vertical leg 30 which rests on the annular flange surface 31. When the end of the horizontal part 29 of the lever 28 is lifted as viewed in FIGURE 1, the valve 10 is closed. When the end 29 of the horizontal portion of the lever 28 is moved downward as viewed in FIGURE 1, the valve 10 is opened to allow water to flow from the supply tube 14 into the upper end of the annular space 46 within the hush tube 40 fixed to the body 11. The water enters the interior of the tank through the open lower end 45 of the hush tube 40.

The extreme lower end 45 of the hush tube is cut at an angle. The water delivery tube 14 extends completely through the hush tube 40 and the annular space between the tubes forms a passageway 46 for delivery of water into the interior of the float tank. The bottom wall of the float tank is indicated at 47.

The float generally designated 60 slides freely on the cylindrical portion 41 of the hush tube 40. This float comprises duplicate half sections 61 and 62 which are preferably formed of molded plastic material. Each of these half sections includes concentric inner and outer tubular parts 63 and 64 integrally joined by a bottom wall 65. As shown clearly in FIGURE 1 the outer wall 64 is longer in an axial direction than is the inner wall 63.

Figure 3:
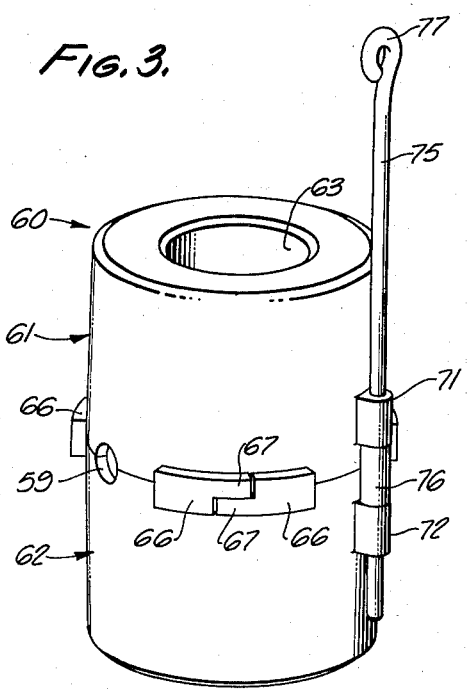
FIGURE 3 is a perspective view.
Figure 5:
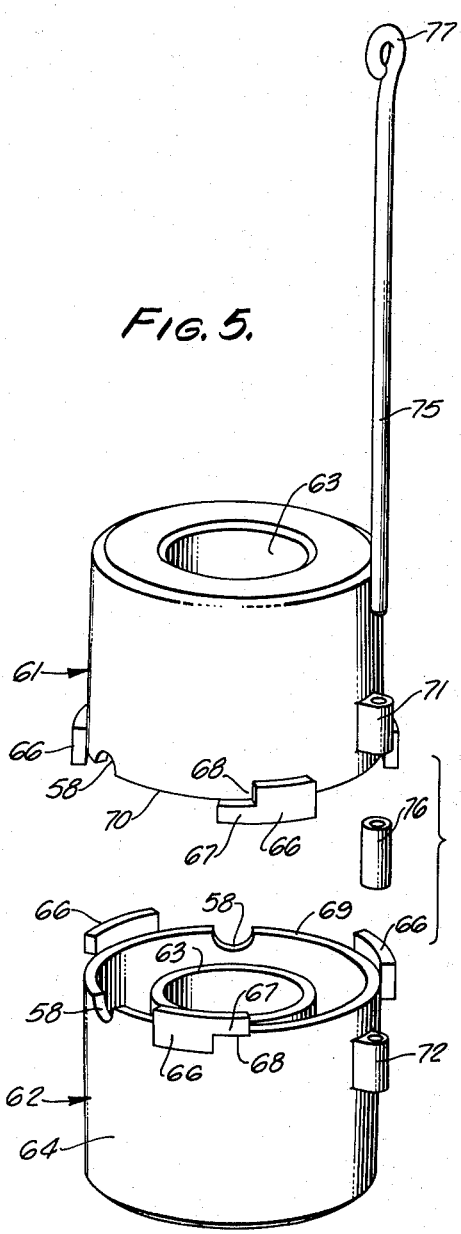
FIGURE 5 is an exploded view showing the parts of the float and the manner of assembly.
Figure 4:
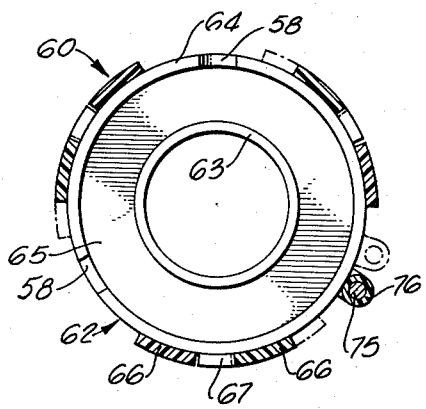
FIGURE 4 is a sectional view taken substantially on lines 4—4 as shown in FIGURE 1.

A plurality of circumferentially spaced lugs 66 are mounted on the outer surface of the exposed end of the outer wall 64. Each of the lugs is provided with a projection 67 and an adjacent recess 68. The shape of the lugs is such that when the duplicate halves 61 and 62 are brought together in an axial direction and then one of the halves turned relative to the other about their common longitudinal axis that the projection 67 on each lug 66 enters the notch 68 on a cooperating lug on the other half of the float. Thus, when the parts are assembled from the position shown in FIGURE 5 to the position shown in FIGURE 3, the projections 67 on each of the lugs 66 on the upper float section 61 engage in notches 68 on the lug 66 on the lower float section 62. When the lugs 66 on the two half sections are brought into engagement as just described, the end surfaces 69 and 70 of the halves 61 and 62 meet in surface contact.

Each of the float halves 61 and 62 is provided with two half-circle notches 58 in the end surfaces 69 and 70, and these notches register to provide openings 59 in the outer wall of the assembled float. Water enters the lower float section 62 through these openings 59 and through the gap between the opposed ends of the inner walls 63.

Each of the float halves 61 and 62 is provided with a boss 71, 72 having an axially extending aperture 73, 74. The apertures 73 and 74 are brought into alignment by the same relative rotary movement between the parts 61 and 62 which brings the lugs 66 into mutual engagement. A float rod 75 is then inserted axially through the aligned apertures 73 and 74 and also through the resilient locking washer 76 which is positioned between the bosses 71 and 72. The central opening in the washer 76 is slightly smaller than the diameter of the rod 75 with the result that a friction grip is maintained on the rod 75 to hold it in adjusted position with respect to the float 60. It will be observed that the presence of the rod 75 in the apertures 73 and 74 prevents disassembly of the two halves of the float 60. The upper end of the rod 75 is provided with an eye 77 which loosely receives the extending end 29 of the lever 28.

In operation, the parts are in the position shown in FIGURE 1 after the tank is filled to the desired level 78. In this position of the parts, water from the tank communicates with the interior of the float through the openings 59 and the gap between the ends of the inner walls 63.

When the conventional flush valve, not shown, is opened to drain the tank, the water level in the tank drops and the float 60 descends by gravity, sliding over the outer surface of the stationary hush tube 40. This downward movement of the water-weighted float 60 causes the attached rod 75 to pull down on the horizontal arm 29 of the lever 28 and thereby move the parts to the dotted-line position shown in FIGURE 3. The water then passes from the delivery tube 14 downward into the annular space 46 within the hush tube 40. Hence, water is delivered into the lower portion of the tank and discharged through the open end 45 of the hush tube 44. It has been found that a silent discharge is achieved by means of the reduced diameter 44 at the lower end of the hush tube and the discharge opening which is disposed at an angle, as shown.

Water from the supply tube 14 also enters the overflow pipe 37 which communicates a port in the valve body 11.

When the water level in the tank raises to the desired height following closure of the conventional flush valve, not shown, the float 60 slides upward along the hush tube 40 and returns the parts to the full line position shown in FIGURE 1, thereby closing the valve 10.

The float 60 may be adjusted to control the maximum elevation of the water in the tank by adjusting the position of the rod 75 with respect to the float 60. The rubber washer 76 frictionally restrains the rod from moving from its adjusted position.

Having fully described my invention, it is to be understood that I am not to be limited to the details herein set forth but that my invention is of the full scope of the appended claims.

I claim:

1. In a float, the combination of: a pair of duplicate half sections, each section comprising inner and outer walls joined at one end by a bottom wall, certain of said walls of the two sections meeting in end-to-end contact, each section having substantially identical lug means, the lug means on the sections being engageable through relative rotary movement of the sections about a common longitudinal axis, each section having means forming an axially extending aperture, the apertures being positioned to be aligned when the lugs are engaged, a float-actuated rod insertable through said apertures when aligned, and means frictionally restraining movement of the rod with respect to said half sections.

2. In a float, the combination of: a pair of duplicate half sections, each section comprising inner and outer walls joined at one end by a bottom wall, the outer walls of said sections meeting in end-to-end contact, the inner walls defining a central axial opening, each section having substantially identical lug means on the outer walls thereof, the lug means being engageable through relative rotary movement of the sections about a common longitudinal axis, each section having a substantially identical apertured boss thereon, a float-actuated rod extending through aligned apertures on said bosses, and means interposed between said bosses frictionally restraining movement of the rod with respect to said half sections.

3. In a float for operating a valve assembly, the combination of: a pair of duplicate half sections, each section comprising concentric inner and outer cylindrical walls joined at one end by an annular bottom wall, the outer walls of said sections meeting in end-to-end contact, the inner walls defining a central axial opening, each section having substantially identical lug means on the outer walls thereof, the lug means being engageable through relative rotary movement of the sections about a common longitudinal axis, each section having a substantially identical apertured boss on the outer wall thereof, a valve actuating rod extending through aligned apertures on said bosses, and a resilient washer encircling the rod between said bosses for frictionally restraining movement of the rod with respect to said half sections.

4. In a float, the combination of: a pair of duplicate half sections, each section comprising inner and outer walls joined at one end by a bottom wall, certain of said walls of the two sections meeting in end-to-end contact, each section having substantially identical lug means, the lug means on the sections being engageable through relative rotary movement of the sections about a common longitudinal axis, each section having an axially extending aperture extending parallel to said common longitudinal axis, said apertures being positioned to be aligned, and a rod extending through said aligned apertures, and serving to prevent relative rotary movement of said sections.

5. In a float, the combination of: a pair of duplicate half sections, each section comprising inner and outer walls joined at one end by a bottom wall, certain of said walls of the two sections meeting in end-to-end contact, each section having substantially identical lug means, the lug means on the sections being engageable through relative rotary movement of the sections about a common longitudinal axis, a valve actuating rod positioned outside said sections, and means on the sections engaging the rod to hold the sections in assembled relationship.

6. In a float, the combination of: a pair of duplicate half sections, each section comprising inner and outer walls joined at one end by a bottom wall, the outer walls of said sections meeting in end-to-end contact, the inner walls defining a central axial opening, the half sections when so connected having an annular interior space, means on the float between said half sections providing an opening for liquid into said interior space, each section having substantially identical lug means on the outer walls thereof, the lug means being engageable through relative rotary movement of the sections about a common longitudinal axis, each section having a substantially identical apertured boss thereon, a float-actuated rod extending through aligned apertures on said bosses, and means interposed between said bosses frictionally restraining movement of the rod with respect to said half sections.

References Cited by the Examiner

UNITED STATES PATENTS

| | | | |
|---|---|---|---|
| 797,697 | 7/05 | Beck et al. | 73—451 |
| 847,361 | 3/07 | Palmer | 137—426 |
| 2,911,000 | 11/59 | Doyle | 137—414 |
| 3,115,893 | 12/63 | Doyle | 73—322.5 X |

ISAAC LISANN, *Primary Examiner.*